United States Patent [19]
Gallagher, Jr.

[11] Patent Number: 5,766,400
[45] Date of Patent: Jun. 16, 1998

[54] METHOD OF PRODUCING PREFABRICATED MULTI LAYERED FLEXIBLE PRODUCTS AND PRODUCTS HAVING IMPROVED SEALING PROFILES RESULTING THEREFROM

[75] Inventor: Joseph E. Gallagher, Jr., Mechanicsville, Pa.

[73] Assignee: Liteliner, L.L.C., Mechanicsville, Pa.

[21] Appl. No.: 697,648

[22] Filed: Aug. 27, 1996

[51] Int. Cl.$^6$ ............................................. B32B 31/00
[52] U.S. Cl. .................... 156/251; 156/267; 156/269; 156/290; 156/308.4
[58] Field of Search .......................... 156/251, 267, 156/269, 290, 308.4, 510, 515, 549

[56] References Cited

U.S. PATENT DOCUMENTS

| | | | |
|---|---|---|---|
| 3,656,594 | 4/1972 | Marks et al. | 190/57 |
| 4,135,957 | 1/1979 | Voller | 156/157 |
| 4,469,744 | 9/1984 | Grot et al. | 428/246 |
| 4,545,841 | 10/1985 | Jackrel | 156/290 |
| 4,574,173 | 3/1986 | Bennett | 219/10.53 |
| 4,643,791 | 2/1987 | Jurrius et al. | 156/251 |
| 4,804,432 | 2/1989 | Jurrius et al. | 156/350 |
| 4,831,667 | 5/1989 | Town | 2/163 |
| 4,847,918 | 7/1989 | Sturm | 2/161 R |
| 4,943,475 | 7/1990 | Baker et al. | 428/246 |
| 5,024,594 | 6/1991 | Athayde et al. | 428/246 |
| 5,036,551 | 8/1991 | Dailey et al. | 2/167 |
| 5,123,119 | 6/1992 | Dube | 2/168 |
| 5,133,344 | 7/1992 | Jurrius et al. | 128/201.23 |
| 5,234,523 | 8/1993 | Battreall | 156/283 |
| 5,235,713 | 8/1993 | Guthrie et al. | 5/453 |
| 5,244,525 | 9/1993 | Neuwirth et al. | 156/251 |
| 5,294,258 | 3/1994 | Jarrel et al. | 118/410 |
| 5,336,346 | 8/1994 | Meltzer et al. | 156/73.4 |
| 5,348,604 | 9/1994 | Neff | 156/272.8 |
| 5,349,166 | 9/1994 | Taylor | 219/643 |
| 5,366,801 | 11/1994 | Bryant et al. | 428/283 |
| 5,402,540 | 4/1995 | Williams | 2/239 |
| 5,484,645 | 1/1996 | Lickfield et al. | 428/198 |
| 5,494,736 | 2/1996 | Willey et al. | 428/288 |
| 5,543,604 | 8/1996 | Taylor | 219/643 |
| 5,569,507 | 10/1996 | Goodwin | 156/290 X |

FOREIGN PATENT DOCUMENTS

562703  12/1994  Japan.

*Primary Examiner*—James Sells
*Attorney, Agent, or Firm*—Daniel N. Lundeen

[57] ABSTRACT

A prefabricated multi-layered flexible product which can be used as a liner for an outer shell or as a stand-alone product. A substrate fabric material is placed in parallel with a synthetic film membrane to form a two ply laminate, and with outer substrate fabric material(s) to form multi- ply laminates. A thermoplastic film is strategically placed in between the layers to enhance bonding. The laminate(s) and/or separate sheets of above materials are assembled by using a radio frequency welding process and then cut into two or three dimensional forms, which in their bonded state form either a prefabricated component liner or a prefabricated stand alone product. The form may be a glove, sock, shirt, boot/shoe, hat, jacket, pant, etc.

16 Claims, 3 Drawing Sheets

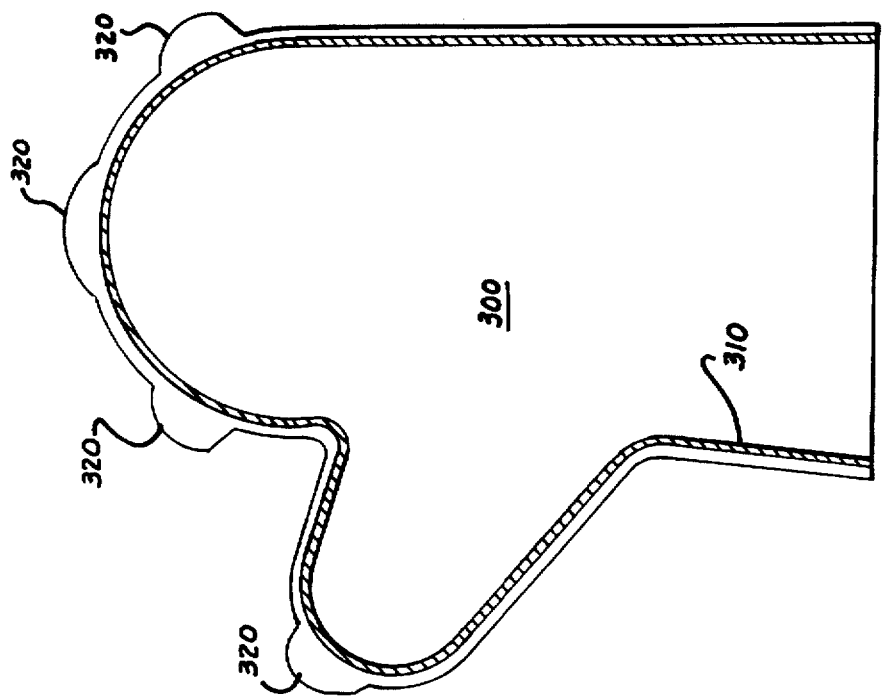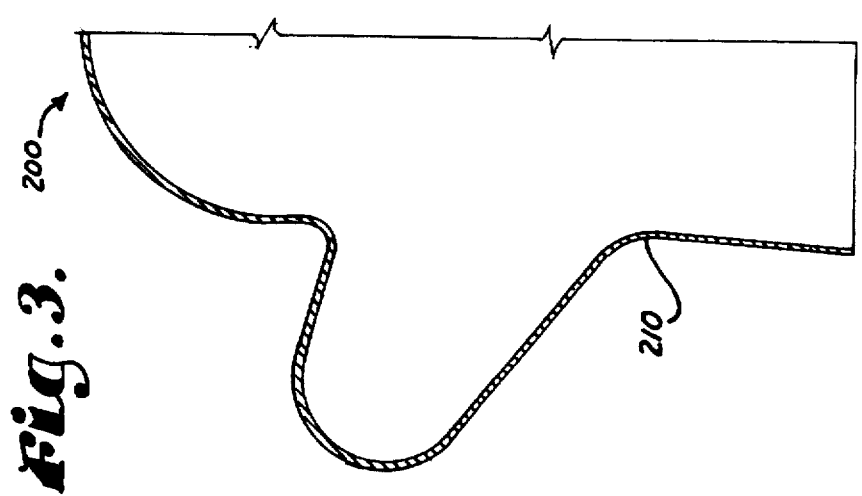

METHOD OF PRODUCING PREFABRICATED MULTI LAYERED FLEXIBLE PRODUCTS AND PRODUCTS HAVING IMPROVED SEALING PROFILES RESULTING THEREFROM

BACKGROUND OF THE INVENTION

1. Field of the Invention

This invention relates to the fabrication process for waterproof, waterproof/breathable, windproof (with or without vapor permeable/moisture vapor transfer) apparel involving a post- or a pre-lamination process in order to provide a water tight seam.

More specifically this invention teaches the joining of a synthetic film membrane which, among other suitable materials may be a homogenous polyurethane or polyolefin membrane, with a substrate fabric material to form a sealed seam that prevents liquid penetration, by means other than the usual method of stitching a seam followed by tape and glue applications.

2. Information Disclosure Statement

To date liners for apparel and footwear have been assembled by the stitch and seam method whereby two layers are joined by a stitch pattern creating a seam. Waterproofing the seam was accomplished by taping and gluing the seam. However taped and glued, stitched seams tend to fail when subjected to stress from repeated use. The following prior art is representative of laminates or composites used as fabrics or in conjunction with fabrics.

U.S. Pat. No. 4,847,918 issued to Sturm discloses a flexible fire retardant and heat insulating glove that is mounted within and cemented to a flexible, water tight, vapor permeable plastic glove. A flexible reinforcement element having the outline of the plastic glove, with fingers somewhat longer than the fingers of the plastic glove, is cemented to one face of the plastic glove, in substantial registry therewith. The fingers of the reinforcement element extending beyond the fingers of the plastic glove to provide securement tabs. These securement tabs are stitched or tacked to the tips of the fingers of a reversed leather glove, which is then pulled over the plastic glove and reinforcement element.

U.S. Pat. No. 5,036,551 issued to Dailey et al concerns elastomeric composite fabrics which have a layered construction and are made of a microporous polymeric membrane, water vapor permeable polymer, and an elastomeric thermoplastic nonwoven material. The elastomeric composite fabrics provide barrier properties with water vapor permeability and find utility in articles which conform about another object.

U.S. Pat. No. 5,123,119 issued to Dube concerns a two component, waterproof, breathable glove and the corresponding methods of forming the glove. A homogenous membrane in regard to its permeability characteristics is attached to a fabric. The membrane is tacky on one surface and wear resistant on the other surface. Using a contoured mold and foam forms, the layers for the inner liner are cut and are thermowelded or bonded together to form a three dimensional inner shell of a glove. Then the formed inner shell is attached to an outer glove shell by conventional methods.

U.S. Pat. No. 5,234,523 issued to Battreall discloses a method for laminating a gas permeable layer onto a preformed substrate by forming a laminate precursor comprising a substrate and a gas permeable layer in which a layer of adhesive is positioned between the gas permeable layer and the substrate surface. A layer of water is formed on the surface of the gas permeable layer and the wetted surface is contacted by a preheated platen and, super heated steam is ejected onto the gas permeable layer causing the adhesive to cure and bond the gas permeable layer to the substrate.

U.S. Pat. No. 5,294,258 issued to Jarrel et al concerns a breathable laminate which comprises at least two porous webs laminated together with a porous adhesive matrix, preferably a random fibrous adhesive pattern having a coat weight of between 1.5 and 12 grams per square meter. The two or more porous webs comprise woven or non-woven materials and the resulting breathable fabric or laminate has good hand flexibility. Breathable fabric is adhered to the foam by such random adhesive patterns of similar coat weights. Coating widths of up to 80 inches or more are produced in a slot die, with motors and pumps controlled to maintain consistent, uniform coat weights regardless of coat widths and substrate speeds selected.

U.S. Pat. No. 5,366,801 to Bryant et al. describes a coating which when applied to fabrics enhances the thermal characteristics of the coated fabric. The coating includes integral and leak-resistant microcapsules filled with phase change material or plastic crystals that have specific thermal properties at predetermined temperatures.

A disclosure of Toshiichi Osako which describes an arctic glove comprised of a cloth material on the outside, waterproof materials in the middle layer and a woven or knit material on the inside. The three layers are bonded together with adhesives in a dotted state.

Notwithstanding the above prior art, there is no teaching or suggestion of obviousness therein respecting the present invention method of producing a substrate fabric and synthetic film membrane laminate or, an outer substrate fabric, substrate fabric and synthetic film membrane laminate for application as a liner for clothing and footwear as described herein. More particularly, there is no teaching or suggestion of utilizing the laminates disclosed herein in a manner which eliminates the need for any post-construction manufacturing techniques traditionally used, such as stitched seams which are taped and glued, for providing a waterproof, waterproof/breathable, windproof, or vapor permeable synthetic seal.

SUMMARY OF THE INVENTION

The present invention concerns a method of producing prefabricated, multi-layered flexible products which eliminates traditional post-construction techniques for clothing and apparel, which traditionally would have been a liner with a stitched seam which must be taped and glued for waterproof applications. However in the present invention, a substrate fabric material is adhered to a synthetic film membrane in a two-ply laminate, and with outer substrate fabric material(s) in a multi-ply laminate. The sheets and/or laminate(s) are assembled by using a radio frequency welding process which employs a thermoplastic film, with or without adhesive properties, and then cut into two or three dimensional forms, which are parallel to each other so that when adhered together at the perimeter they form either a prefabricated component liner or a prefabricated stand alone product. The form may be a glove, sock, shirt, boot/shoe, hat, jacket, pant, etc.

The present invention overcomes the problems of previous methods and products by providing a thermoplastic film, with or without adhesive properties, between the laminate(s) or sheets. In the case of a multi-ply product, the thermoplastic film, with or without adhesive properties, is also placed on the other side of the sheet(s) or laminate(s) to assist the sealing process. For example, for substrate materials that have inherent wicking capabilities, i.e., fleece, the outer surface(s) of the weld areas must have a thermoplastic film placed on them (as in the inside) to insure a waterproof seal. After the sealing is complete, the article is die and/or hand cut to form, and the excess film is removed, leaving a prefabricated component liner or stand alone product.

Sealed positioning tab(s) may be created during the seal and cut operations for the prefabricated component liner, and may then be used to adhere the outer shell together at the tab location(s). In the case of a prefabricated stand alone product you can use the sealed tab(s) to attach peripheral components, i.e., cuff(s), strap(s), zipper(s), etc.

BRIEF DESCRIPTION OF THE DRAWINGS

The present invention should be more fully understood when the specification herein is taken in conjunction with the drawings appended thereto, wherein:

FIG. 3 is a partial view of a weld bar in accordance with the present invention;

FIG. 4 is a schematic view of a glove with positioning tabs in accordance with the present invention;

DETAILED DESCRIPTION OF THE PRESENT INVENTION

The present invention is a method of producing prefabricated, multi-layered flexible products eliminating traditional post construction techniques for clothing and apparel, such as producing a liner with using sewn seams which must be taped and glued for waterproof applications. In this invention, the method can be used to weld together laminates, which are produced through conventional means by adhering substrate fabric material to a synthetic film membrane, and/or separate sheets of substrate fabric material and synthetic film membrane to form the prefabricated multilayered flexible product. Specifically, laminates can be of the two ply variety, where a substrate fabric material is adhered to a synthetic film membrane. Alternatively, they can be of the multi-ply variety, where an outer substrate fabric material is adhered to the remaining side of the synthetic film membrane, sandwiching the membrane between the traditionally produced laminates.

The laminates or separate sheets are placed in a parallel configuration with the center sheet always being the thermoplastic film, with or without adhesive properties. These are then assembled by using a radio frequency welding process at the perimeter of the outer edge of the substrate fabric material, outlining a specific form. The welded piece is then cut into the corresponding two or three dimensional form, which is the prefabricated component liner or a prefabricated stand-alone product. The form may be a glove, sock, shirt, boot/shoe, hat, jacket, pant and/or any other variations thereof. The prefabricated, multi-layered flexible product is then placed into a similarly configured outer prefabricated product by the use of positioning tab(s) which are then glued and/or sewn in place, and/or without the use of positioning tabs by placing adhesive at specific, strategic areas, i.e. in the fingers or cuff area to hold the two prefabricated pieces together. Alternatively, the prefabricated multi-layered flexible product can stand-alone as a finished product.

Figure 1:
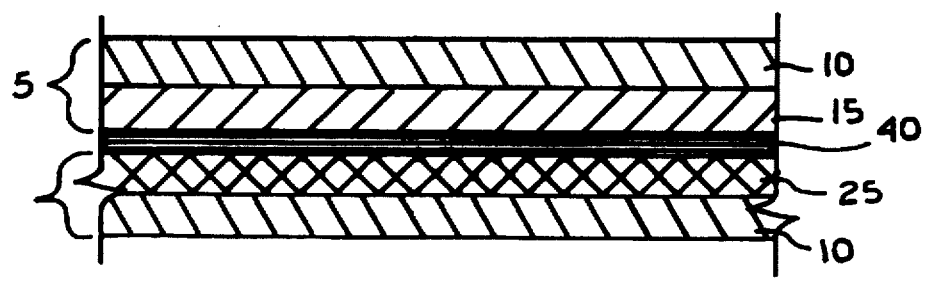
FIG. 1 is a cross sectional view of an embodiment of a two layer product of the present invention.
Figure 2:
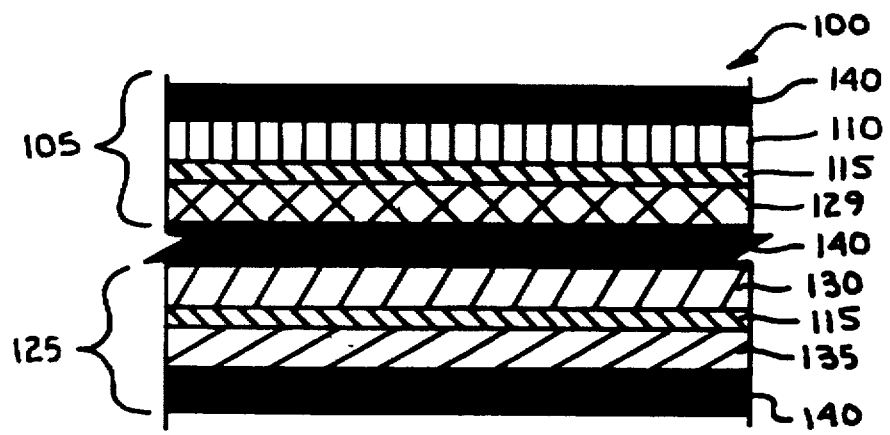
FIG. 2 is a cross sectional view of an embodiment of a multi layer product of the present invention.

Referring to FIGS. 1 and 2 there is shown a cross sectional view of a prefabricated two-layered flexible product 1 and a multi-layered flexible product 100, both being representative of the present invention. Referring specifically to FIG. 1, a first section 5 and a second section 20 each have a substrate fabric material layer 15 and 25, respectively, which lie parallel to a synthetic film membrane 10. First section 5 and second section 20 can either be laminates constructed via any conventional means or be separate sheets. Referring now specifically to FIG. 2, in a top section 105, an outer substrate fabric material 110 lies in parallel to a synthetic film membrane 115, which in turn lies parallel to a substrate fabric material 120. Similarly in a bottom section 125, an outer substrate fabric material 135 lies in parallel to a synthetic film membrane 115, which in turn lies parallel to a substrate fabric material 130. Outer substrate fabric can provide protection and/or insulation for synthetic film membrane 115. It should be noted that the outer substrate fabric material and substrate fabric material used in top section 5 (105) can be different from bottom section 20 (125). This configuration is particularly applicable to fleece. For example, for substrate materials that have inherent wicking capabilities, i.e., fleece, the outer surface(s) of the weld areas must have a thermoplastic film placed on them (as in the inside) to insure a waterproof seal.

Substrate fabric material and outer substrate fabric material 15, 25, 110, 120, 130 and 135 may be woven or non-woven material that is either non-stretch or stretch and in turn hydrophobic or hydrophilic. These variations in choice of materials may allow the use of any of the following materials for substrate fabric material and outer substrate fabric material 15, 25, 110, 120, 130 and 135: woven non-stretch, woven two-way stretch, woven four-way stretch, non-woven non-stretch, non-woven two-way stretch, non-woven four-way stretch, woven non-stretch hydrophobic, woven two-way stretch hydrophobic, woven non-stretch hydrophilic, woven two-way stretch hydrophilic, woven four-way stretch hydrophobic, woven four-way stretch hydrophilic, non-woven two-way stretch hydrophobic, non-woven two-way stretch hydrophilic, non-woven four-way stretch hydrophobic, and non-woven four-way stretch hydrophilic.

The synthetic film membrane 10 and 115 material may be waterproof, waterproof/breathable or windproof material that is either vapor permeable or non vapor permeable. Among the materials suitable for a synthetic film membrane 10 and 115 material are: waterproof vapor permeable homogenous polyurethane, waterproof vapor permeable homogenous polyolefin, waterproof non-vapor permeable homogenous polyurethane, waterproof non-vapor permeable homogenous polyolefin, waterproof/breathable vapor permeable homogenous polyurethane, waterproof/ breathable vapor permeable homogenous polyolefin, waterproof/breathable non-vapor permeable homogenous polyurethane, waterproof/breathable non-vapor permeable homogenous polyolefin, windproof vapor permeable homogenous polyurethane, windproof vapor permeable homogenous polyolefin, windproof non-vapor permeable homogenous polyurethane, windproof non-vapor permeable homogenous polyolefin.

Referring to both FIGS. 1 and 3, top section 5 (105) and bottom section 20 (125) are assembled using a radio frequency welding process to provide a leak proof seal at the perimeter of the outer edge of either substrate fabric material 15, 25, 120 and 130 and outer substrate fabric material 110, and 135. Although radio frequency processing has been used in the past, the combination of the heat and pressure has resulted in damaging the substrate fabric material and the outer substrate fabric material. This occurs because the heat and pressure results in crystallization of the material and the material thereafter breaks apart. As a consequence, prefabricated multi-layered flexible products do not exist. The present invention uses a thermoplastic film, with or without adhesive properties 40 (140) which aids in the bonding process within the weld area between the laminates or separate sheets. Thermoplastic film, with or without adhesive properties, 40 (140) enhances the substrate fabric material's and outer substrate fabric material's reactivity at lower temperatures. The film decreases the amount of heat and pressure needed to create the weld and thereby results in no damage to the multilayered laminates. The film permits a single piece construction of the prefabricated multi-layer flexible product without the use of post-construction manufacturing techniques, such as sewing, gluing and/or taping. In addition, the laminating process can be eliminated by welding all of the materials together at the welded seams to form a prefabricated component liner or a prefabricated stand-alone product.

Referring now also to FIG. 3, a weld bar 210 is shown for a glove 200 constructed using the techniques described above and below. The finished product is then hand and/or die cut along the outside of weld bar 210 to finish the seam to within 1/32"–1/8". Excess thermoplastic film 40 (140), which was not used in the areas of the seams to be welded, is then removed, i.e. for a glove form there would exist an opening for the hand through which the remaining thermoplastic film would then be removed.

Referring now to FIG. 4, a glove 300 has a weld bar 310 and a set of sealed positioning tabs 320. Sealed positioning tabs 320 for the prefabricated component liner can be extended out from the welds to form sewing and/or alignment tab(s) at predetermined locations such shoe eyelets and tongues, sleeve and leg cuffs, zippers, waist bands, etc., for achieving proper fit and position between the inner prefabricated component 415 (referring to FIGS. 5 and 6) and outer prefabricated product 417. In the case of prefabricated stand-alone products, the tab(s) 320 can be used to attach cuff(s), strap(s), zipper(s) and other such items. More intricate layouts tab(s) 320 may be used to align the seams of the inner prefabricated component 415 (referring to FIGS. 5 and 6) with the seams of any outside shell 417 product where the inner prefabricated component 415 is to be placed inside.

Figure 5:
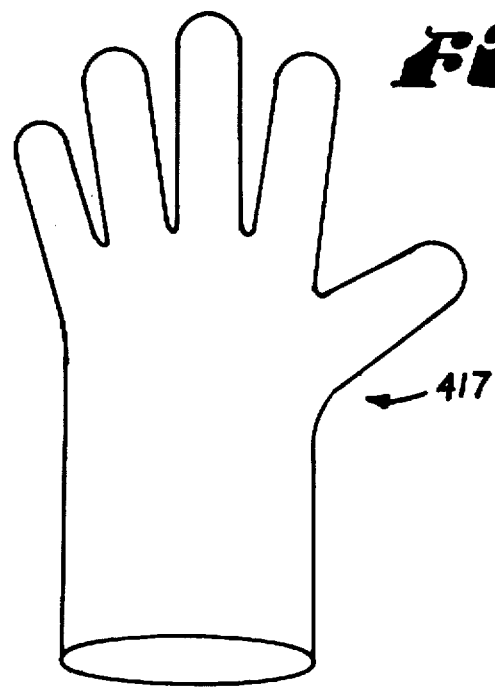
FIG. 5 is an outer shell.
Figure 7:
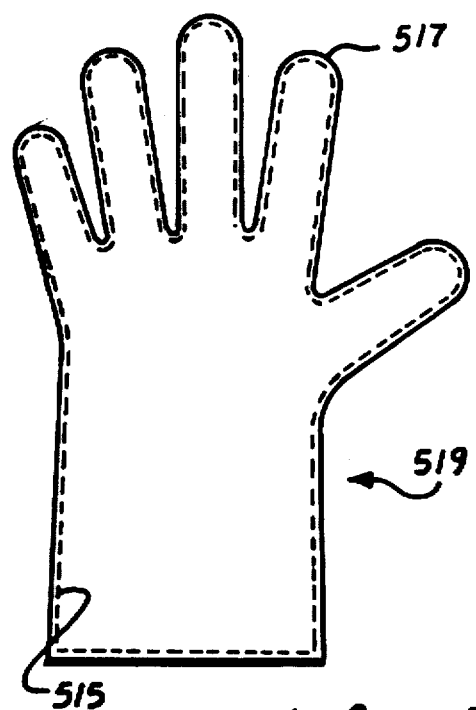
FIG. 7 is a finished product in accordance with an embodiment of the present invention.
Figure 6:
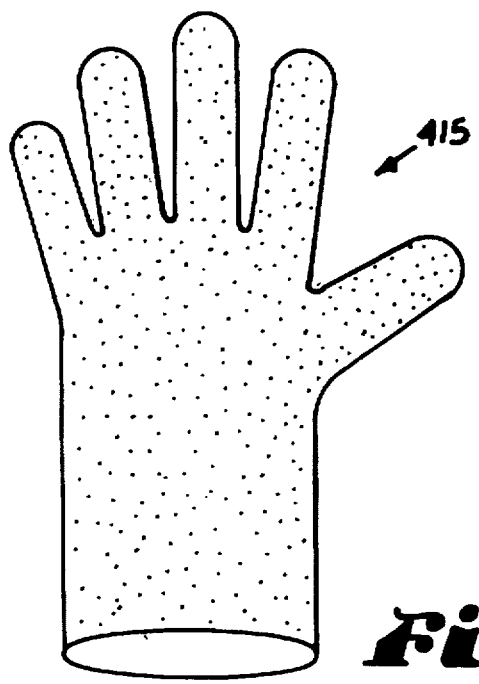
FIG. 6 is an inner shell in accordance with the present invention.

Referring specifically to FIGS. 5 and 6 there is an inner prefabricated component 415 just before insertion into an outer prefabricated shell 417, wherein both are configured as gloves. The prefabricated component liner 415 is positioned into a similarly configured outer prefabricated shell 417 so that tabs 320 of the inner prefabricated component liner 415 is matched to the outer prefabricated shell 417 and glued and/or sewn together in the tabs 320 and turned right side out and finished. Outer prefabricated shell 417 may be a sock, boot, shoe, jacket, shirt, pants, or hat and the inner prefabricated component 415 may be similarly configured so as to fit as a liner. Referring now to FIG. 7, there is shown a final product 500 consisting of an outer prefabricated shell 517 sewn or glued to an inner prefabricated component 515. In the case of a prefabricated stand-alone product, the product can be turned right side out to hide the welds to the inner facing and finished by adding a cuff or other such accessories.

Obviously, numerous modifications and variations of the present invention are possible in light of the above teachings. For example, the synthetic film membrane 7 material may be one of various thermoplastic or thermosetting resins suitable for use in place of polyurethane or polyolefin. It is therefore understood that within the scope of the appended claims, the invention may be practiced otherwise than as specifically described herein.

What is claimed is:

1. A method of producing a prefabricated multi-layered flexible product, comprising the steps of:

a) overlaying a first substrate fabric material in a parallel configuration onto a synthetic film membrane to form a top section;

b) repeating said overlaying step with a second substrate fabric material and another synthetic film membrane to create a bottom section;

c) positioning a thermoplastic film between said top section and said bottom section, said thermoplastic film being selected from the group consisting of thermoplastic films without adhesive properties or thermoplastic films with adhesive properties;

d) welding said top section, said thermoplastic film, and said bottom section together to provide a leak proof seal at a perimeter of an outer edge of said substrate fabric material in a predetermined form;

e) cutting said welded material to finish a seam within a predetermined width to form said prefabricated multi-layered flexible product; and f) removing a remaining portion of said thermoplastic film not used in said welding step.

2. A process as recited in claim 1, further comprising the step of positioning said prefabricated multi-layered flexible product into a similarly configured outer prefabricated product.

3. A process as recited in claim 1, further comprising the step of turning said prefabricated multi-layered flexible product inside out so as to use said prefabricated multi-layered flexible product as a stand-alone product.

4. A process as recited in claim 1, wherein said predetermined form is a two dimensional form.

5. A process as recited in claim 1, wherein said predetermined form is a three dimensional form.

6. A process as recited in claim 1, wherein said perimeter weld includes at least one positioning tab.

7. A process as recited in claim 1, wherein said overlaying step further includes the step of putting an outer substrate fabric material onto a remaining side of said synthetic film membrane.

8. A process as recited as in claim 7, wherein said positioning step further comprises the step of applying said thermoplastic film onto a remaining side of said outer substrate fabric material.

9. A process as recited in claim 1, wherein said substrate fabric material and said second substrate fabric material is selected from the group consisting of woven non-stretch, woven two-way stretch, woven four-way stretch, non-woven non-stretch, non-woven two-way stretch, non-woven four-way stretch, woven non-stretch hydrophobic, woven two-way stretch hydrophobic, woven non-stretch hydrophilic, woven two-way stretch hydrophilic, woven four-way stretch hydrophobic, woven four-way stretch hydrophilic, non-woven two-way stretch hydrophobic, non-woven two-way stretch hydrophilic, non-woven four-way stretch hydrophobic, and non-woven four-way stretch hydrophilic.

10. The process as recited in claim 1, wherein said synthetic film membrane is selected from the group consisting of waterproof vapor permeable homogenous polyurethane, waterproof vapor permeable homogenous polyolefin, waterproof non-vapor permeable homogenous polyurethane, waterproof non-vapor permeable homogenous polyolefin, waterproof/breathable vapor permeable homogenous polyurethane, waterproof/breathable vapor permeable homogenous polyolefin, waterproof/breathable non-vapor permeable homogenous polyurethane, waterproof/breathable non-vapor permeable homogenous polyolefin, windproof vapor permeable homogenous polyurethane, windproof vapor permeable homogenous polyolefin, windproof non-vapor permeable homogenous polyurethane, windproof non-vapor permeable homogenous polyolefin.

11. The process as recited in claim 7, wherein said outer substrate fabric material is selected from the group consisting of woven non-stretch, woven two-way stretch, woven four-way stretch, non-woven non-stretch, non-woven two-way stretch, non-woven four-way stretch, woven non-stretch hydrophobic, woven two-way stretch hydrophobic, woven non-stretch hydrophilic, woven two-way stretch hydrophilic, woven four-way stretch hydrophobic, woven four-way stretch hydrophilic, non-woven two-way stretch hydrophobic, non-woven two-way stretch hydrophilic, non-woven four-way stretch hydrophobic, and non-woven four-way stretch hydrophilic.

12. A method for producing a prefabricated flexible product comprising the steps of:

a) providing first and second fabric material substrates that are arranged parallel to one another and that are to be joined together along a weld;

b) positioning a thermoplastic film between said first and second substrates so as to be located along the length of the location whereat the first and second substrates are to be welded;

c) welding said first and second substrates together by application of energy to said thermoplastic film so as to thermally melt said film along the weld;

d) prior to said welding step placing a first synthetic film membrane over said first substrate; and e) placing a second synthetic film membrane over said second substrate such that during said welding step said first and second substrates, said first and second synthetic film membranes and said thermoplastic film are all joined along said weld.

13. The method according to claim 12 including the step of:

a) placing the weld along the entire perimeter of the product to be produced.

14. The method of claim 13 including the step of:

a) cutting about the perimeter of the product so as to remove excess substrate therefrom.

15. The method of claim 14 including the step of:

a) removing a remainder of thermoplastic film extending substantially outside of the region of the weld.

16. The method according to claim 12 including the steps of:

a) providing a prefabricated outer layer to be joined with said product; and, subsequent to said welding step:

b) placing said product into said outer prefabricated layer and joining said flexible product with said outer refabricated layer.

* * * * *

UNITED STATES PATENT AND TRADEMARK OFFICE
CERTIFICATE OF CORRECTION

PATENT NO. : 5,766,400
DATED : June 16, 1998
INVENTOR(S) : Joseph E. Gallagher, Jr.

It is certified that error appears in the above-identified patent and that said Letters Patent is hereby corrected as shown below:

The Title page should be deleted and substitute the attached Title page.

Signed and Sealed this

Sixteenth Day of February, 1999

Attest:

*Acting Commissioner of Patents and Trademarks*

Attesting Officer

United States Patent [19]
Gallagher, Jr.

[11] Patent Number: 5,766,400
[45] Date of Patent: Jun. 16, 1998

[54] METHOD OF PRODUCING PREFABRICATED MULTI LAYERED FLEXIBLE PRODUCTS AND PRODUCTS HAVING IMPROVED SEALING PROFILES RESULTING THEREFROM

[75] Inventor: Joseph E. Gallagher, Jr., Mechanicsville, Pa.

[73] Assignee: Liteliner, L.L.C., Mechanicsville, Pa.

[21] Appl. No.: 697,648

[22] Filed: Aug. 27, 1996

[51] Int. Cl.$^6$ .................................. B32B 31/00
[52] U.S. Cl. ............... 156/251; 156/267; 156/269; 156/290; 156/308.4
[58] Field of Search ...................... 156/251, 267, 156/269, 290, 308.4, 510, 515, 549

[56] References Cited

U.S. PATENT DOCUMENTS

| | | | |
|---|---|---|---|
| 3,656,594 | 4/1972 | Marks et al. | 190/57 |
| 4,135,957 | 1/1979 | Voller | 156/157 |
| 4,469,744 | 9/1984 | Grot et al. | 428/246 |
| 4,545,841 | 10/1985 | Jackrel | 156/290 |
| 4,574,173 | 3/1986 | Bennett | 219/10.53 |
| 4,643,791 | 2/1987 | Jurrius et al. | 156/251 |
| 4,804,432 | 2/1989 | Jurrius et al. | 156/350 |
| 4,831,667 | 5/1989 | Town | 2/163 |
| 4,847,918 | 7/1989 | Sturm | 2/161 R |
| 4,943,475 | 7/1990 | Baker et al. | 428/246 |
| 5,024,594 | 6/1991 | Athayde et al. | 428/246 |
| 5,036,551 | 8/1991 | Dailey et al. | 2/167 |
| 5,123,119 | 6/1992 | Dube | 2/168 |
| 5,133,344 | 7/1992 | Jurrius et al. | 128/201.23 |
| 5,234,523 | 8/1993 | Battreall | 156/283 |
| 5,235,713 | 8/1993 | Guthrie et al. | 5/453 |
| 5,244,525 | 9/1993 | Neuwirth et al. | 156/251 |
| 5,294,258 | 3/1994 | Jarrel et al. | 118/410 |
| 5,336,346 | 8/1994 | Meltzer et al. | 156/73.4 |
| 5,348,604 | 9/1994 | Neff | 156/272.8 |
| 5,349,166 | 9/1994 | Taylor | 219/643 |
| 5,366,801 | 11/1994 | Bryant et al. | 428/283 |
| 5,402,540 | 4/1995 | Williams | 2/239 |
| 5,484,645 | 1/1996 | Lickfield et al. | 428/198 |
| 5,494,736 | 2/1996 | Willey et al. | 428/288 |
| 5,543,604 | 8/1996 | Taylor | 219/643 |
| 5,569,507 | 10/1996 | Goodwin | 156/290 X |

FOREIGN PATENT DOCUMENTS 562703  12/1994  Japan.

*Primary Examiner*—James Sells
*Attorney, Agent, or Firm*—Daniel N. Lundeen

[57] ABSTRACT

A prefabricated multi-layered flexible product which can be used as a liner for an outer shell or as a stand-alone product. A substrate fabric material is placed in parallel with a synthetic film membrane to form a two ply laminate, and with outer substrate fabric material(s) to form multi-ply laminates. A thermoplastic film is strategically placed in between the layers to enhance bonding. The laminate(s) and/or separate sheets of above materials are assembled by using a radio frequency welding process and then cut into two or three dimensional forms, which in their bonded state form either a prefabricated component liner or a prefabricated stand alone product. The form may be a glove, sock, shirt, boot/shoe, hat, jacket, pant, etc.

16 Claims, 3 Drawing Sheets

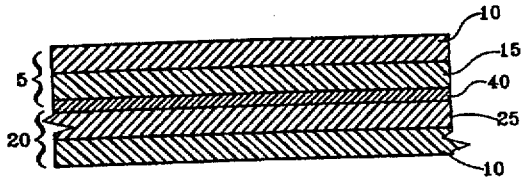

UNITED STATES PATENT AND TRADEMARK OFFICE
CERTIFICATE OF CORRECTION

Page 3 of 3

PATENT NO. : 5,766,400
DATED : June 16, 1998
INVENTOR(S) : Joseph E. Gallagher, Jr.

It is certified that error appears in the above-indentified patent and that said Letters Patent is hereby corrected as shown below: Figs. 1 and 2 are changed as follows:

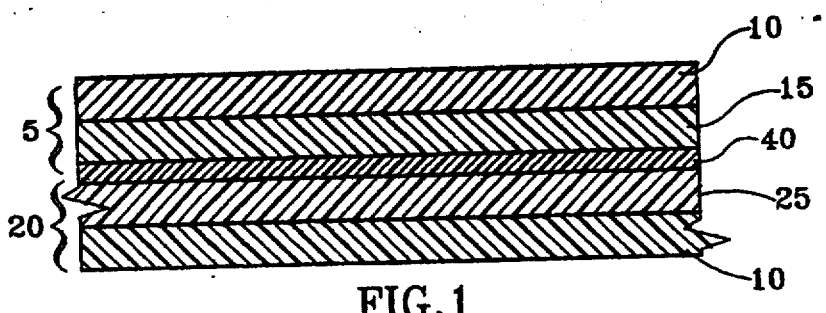

FIG. 1

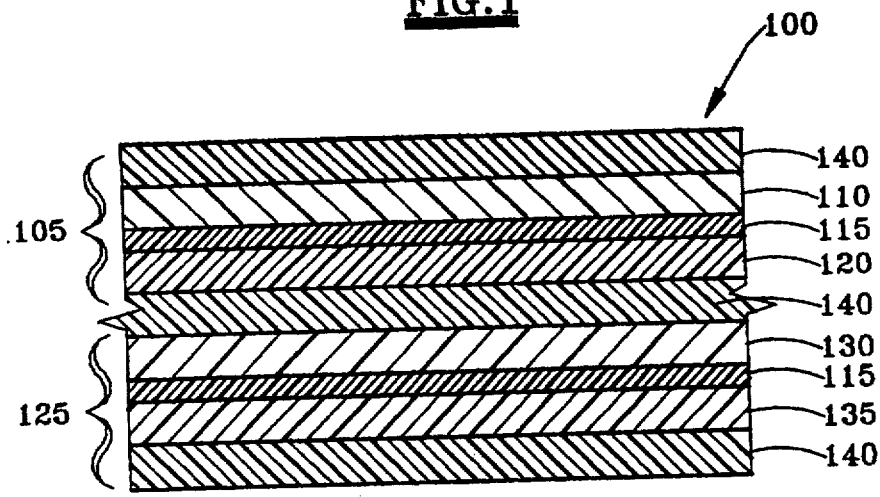

FIG. 2